United States Patent [19]

Sato

[11] Patent Number: 5,232,406

[45] Date of Patent: Aug. 3, 1993

[54] HYDRAULIC CONTROL SYSTEM OF A CONTINUOUSLY VARIABLE TRANSMISSION FOR A MOTOR VEHICLE

[75] Inventor: Keiji Sato, Tokyo, Japan

[73] Assignee: Fuji Jukogyo Kabushiki Kaisha, Tokyo, Japan

[21] Appl. No.: 813,994

[22] Filed: Dec. 27, 1991

[30] Foreign Application Priority Data

Jan. 22, 1991 [JP] Japan ................................. 3-20285

[51] Int. Cl.$^5$ ............................................. F16H 59/00
[52] U.S. Cl. .......................................... 474/28; 474/18
[58] Field of Search ................... 474/8, 11, 12, 17, 18, 474/28, 69, 70; 74/865–868; 364/424.1

[56] References Cited

U.S. PATENT DOCUMENTS

| | | | |
|---|---|---|---|
| 4,673,378 | 6/1987 | Tokoro et al. | 474/28 X |
| 4,850,935 | 7/1989 | Morimoto | 474/18 |
| 4,853,858 | 8/1989 | Kumura | 474/18 X |
| 4,923,433 | 5/1990 | Tanaka et al. | 474/28 X |
| 5,009,129 | 4/1991 | Morimoto et al. | 474/18 X |

Primary Examiner—Thuy M. Bui
Attorney, Agent, or Firm—Martin A. Farber

[57] ABSTRACT

A control valve in an automatic transmission is operated by a solenoid-operated relief valve. A flow rate of the oil through the control valve is calculated. A correcting value is calculated from the calculated flow rate so as to control pressure override of the relief valve to a predetermined value. A solenoid current applied to a solenoid of the relief valve is corrected with the calculated correcting value.

4 Claims, 6 Drawing Sheets

HYDRAULIC CONTROL SYSTEM OF A CONTINUOUSLY VARIABLE TRANSMISSION FOR A MOTOR VEHICLE

BACKGROUND OF THE INVENTION

The present invention relates to a control system for controlling a solenoid-operated valve in a hydraulic circuit of an automatic transmission for a motor vehicle, and more particularly to the system for correcting a pressure override of a relief valve for the solenoid-operated valve.

The control system for a continuously variable transmission (CVT) comprises an endless belt running over a primary pulley and a secondary pulley. Each pulley comprises a movable conical disc which is axially moved by a fluid-operated servo device so as to vary the running diameter of the belt on the pulleys in dependency on driving conditions. The system is provided with the hydraulic circuit including a pump for supplying oil to the servo devices, and a pair of these solenoid-operated control valves for controlling secondary pressure and primary pressure in the circuit.

The system employs an electronic control system for controlling the valves of the hydraulic circuit. The solenoid-operated control valve is operated by a proportional solenoid-operated relief valve and controls the secondary pressure in proportion to control current applied to a solenoid.

FIG. 3 shows characteristics of the secondary pressure Ps responsive to a rotating speed Nop of the oil pump with solenoid current Is as a parameter. As the rotating speed Nop increases, the secondary pressure Ps increases. The relief valve opens at a predetermined pressure called a desired secondary pressure. Even after a relief valve opens, the secondary pressure Ps increases slightly because a spring provided in the relief valve urges against internal resistance of the valve, and others. The difference between this higher secondary pressure and the desired secondary pressure is called pressure override. The flow rate of the oil through the secondary valve changes in accordance with changes in discharge flow rate of the oil pump, temperature of the oil, and transmission ratio changing speed, and others. The pressure override fluctuates with the change of the flow rate through the secondary valve.

Because the pressure override fluctuates, the actual secondary pressure does not coincide with the desired secondary pressure, causing malfunctioning and the belt slipping. Furthermore, excessive pressure may be applied to a hydraulic cylinder.

SUMMARY OF THE INVENTION

An object of the present invention is to provide an electronic control system for a solenoid-operated valve wherein a pressure override is corrected in accordance with the flow rate of oil through a solenoid-operated valve so as to improve control efficiency of a transmission.

According to the present invention, there is provided a hydraulic control system for a continuously variable transmission comprising a hydraulic control circuit including an oil pump and a solenoid-operated control valve having a proportional solenoid-operated relief valve for controlling a secondary pressure, calculator means for calculating a flow rate of oil passing through the control valve in dependency on discharge flow rate of the oil pump, temperature of the oil, leakage of the oil from the circuit, and desired transmission ratio changing speed of the transmission, and pressure override correcting value calculator means responsive to the calculated flow rate for calculating a correcting value of a pressure override, whereby a solenoid current is corrected based on the correcting value.

From the foregoing, the solenoid current is corrected in accordance with the pressure override correcting value based on the flow rate of the oil through the valve. Thus, the actual pressure coincides with the desired pressure, thereby preventing the belt slipping, excessive oil to the hydraulic cylinder, and malfunction of the transmission.

The other objects and features of the present invention will become understood from the following description with reference to the accompanying drawings.

DETAILED DESCRIPTION OF THE PREFERRED EMBODIMENT

Figure 1A:
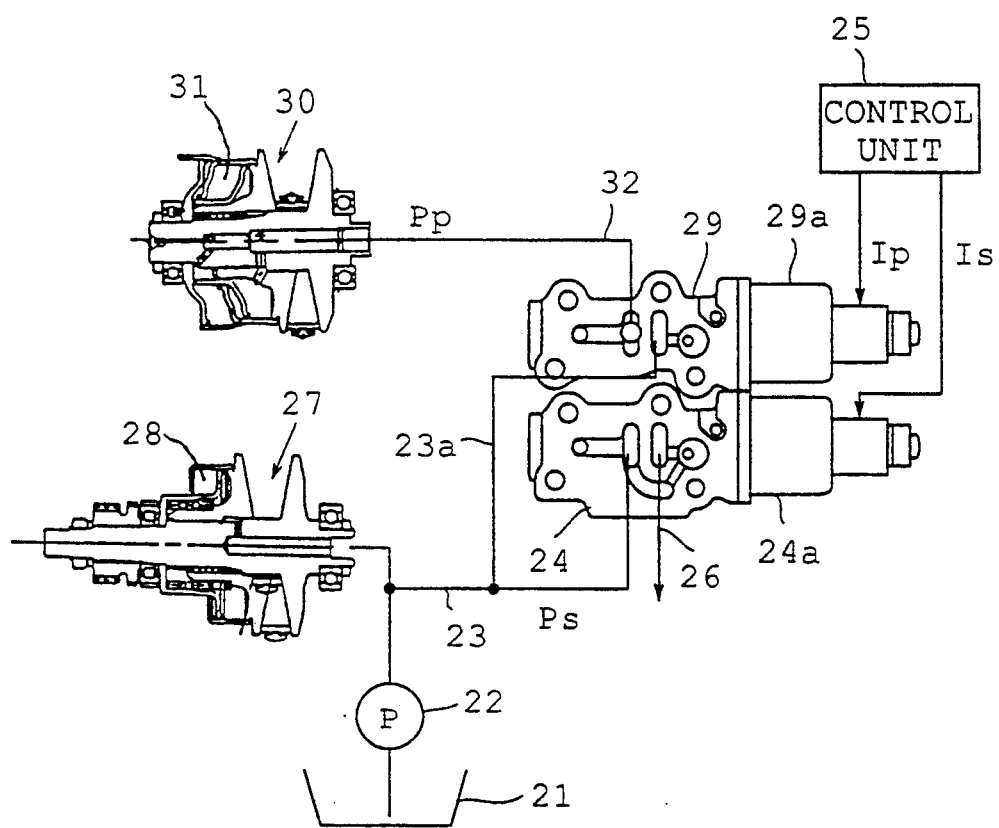
FIG. 1a shows a schematic diagram showing a hydraulic circuit of a continuously variable transmission to which the present invention is applied.

FIG. 1a shows a main part of a hydraulic circuit in a continuously variable transmission (CVT) for a motor vehicle, to which the present invention is applied. An oil pump 22 is provided for supplying pressurized oil to the transmission. Oil in an oil reservoir 21 is supplied to a secondary pressure control valve 24 through a passage 23 by the pump 22 for producing a predetermined secondary pressure Ps. An oil passage 20 connected to the passage 23 is communicated with a secondary cylinder 28 of a secondary pulley 27 in the transmission, so that the secondary pressure Ps is applied to the cylinder 28. The passage 23 is further communicated with a primary pressure control valve 29 through a passage 23a so that the secondary pressure Ps is applied to the primary pressure control valve 29. A primary cylinder 31 of a primary pulley 30 is applied with a primary pressure Pp controlled by the primary pressure control valve 29 through a passage 32.

The secondary pressure control valve 24 is described hereinafter.

The secondary pressure control valve 24 is adapted to be operated by a proportional solenoid-operated relief valve 24a attached thereto.

Figure 1B:
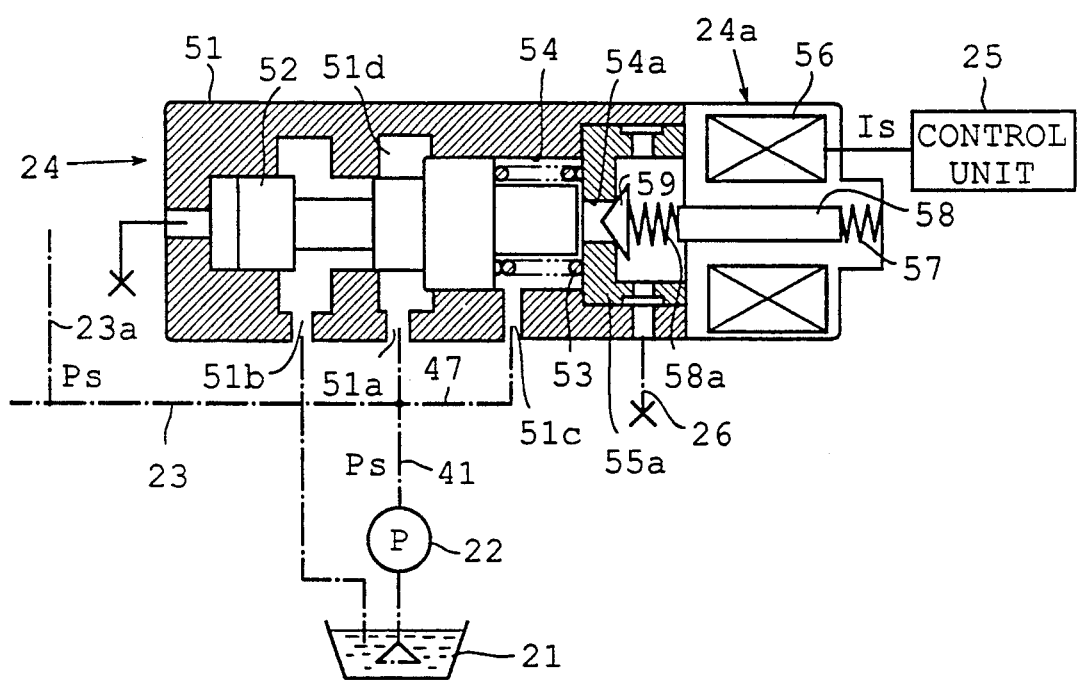
FIG. 1b is a sectional view of a secondary pressure control valve.

Referring to FIG. 1b, the secondary pressure control valve 24 has a valve body 51, a spool 52, and a spring 53 for urging the spool in the downshift direction. The spring 53 is provided in a control chamber 54. A port 51a of the valve body 51 is communicated with the oil pump 22 through a passage 41. The port 51a is selectively communicated with a drain port 51b in accordance with the position of the spool 52. The secondary pressure Ps is applied to the lands of the spool 52 to urge the spool 52 against the spring force of the spring 53. The port 51a communicates with the cylinder 28 of the secondary pulley 27 through the passage 23, and communicates with a port of the primary pressure control valve 29 through the passage 23 and 23a. The oil is drained from the drain port 51b for regulating the pressure of oil. A passage 47 connected to the passage 41 is communicated with a port 51c of the control chamber 54 so as to supply the secondary pressure Ps to the chamber 54.

The proportional solenoid-operated relief valve 24a is attached to the control valve 24. The operated relief valve 24a comprises a cylinder 55a, mounted in the valve body 51 adjacent the control chamber 54, a proportional solenoid 56 adjacent to the cylinder 55a, a plunger 58 slidably mounted in the solenoid 56 and held by a spring 57, and a relief valve body 59 connected to the plunger 58 through a damper spring 58a. The valve body 59 is engaged with a drain port 54a of the control chamber 54 formed in the cylinder 55a.

The relief valve 24a is operated by a current Is from the control unit 25. When the solenoid 56 is energized, the valve body 59 is retracted to open the drain port 54a.

Thus, control pressure Pc in the chamber 54 is controlled by controlling the drain from the drain port 54a, which is performed by controlling the current Is.

The primary pressure control valve 29 has the same structure as the secondary pressure control valve 24 and is operated by a solenoid operated relief valve 29a.

The solenoid-operated valve 29a is also operated by a solenoid current Ip from the control unit 25. The current Ip produces electromagnetic force to control the primary pressure Pp in the same manner as the secondary pressure control valve 24.

A comparatively high lubricating pressure is produced in a drain passage 26 of the secondary pressure control valve 24. The lubricating pressure is applied to a torque converter, a selector device and a belt.

The control unit 25 controls the solenoid currents Is and Ip in dependency on actual and desired rotating speeds of the pulleys of the transmission, and vehicle speed and throttle valve opening degree corresponding to the driving and operating conditions of the vehicle, thereby controlling the transmission ratio of the transmission.

Figure 2:
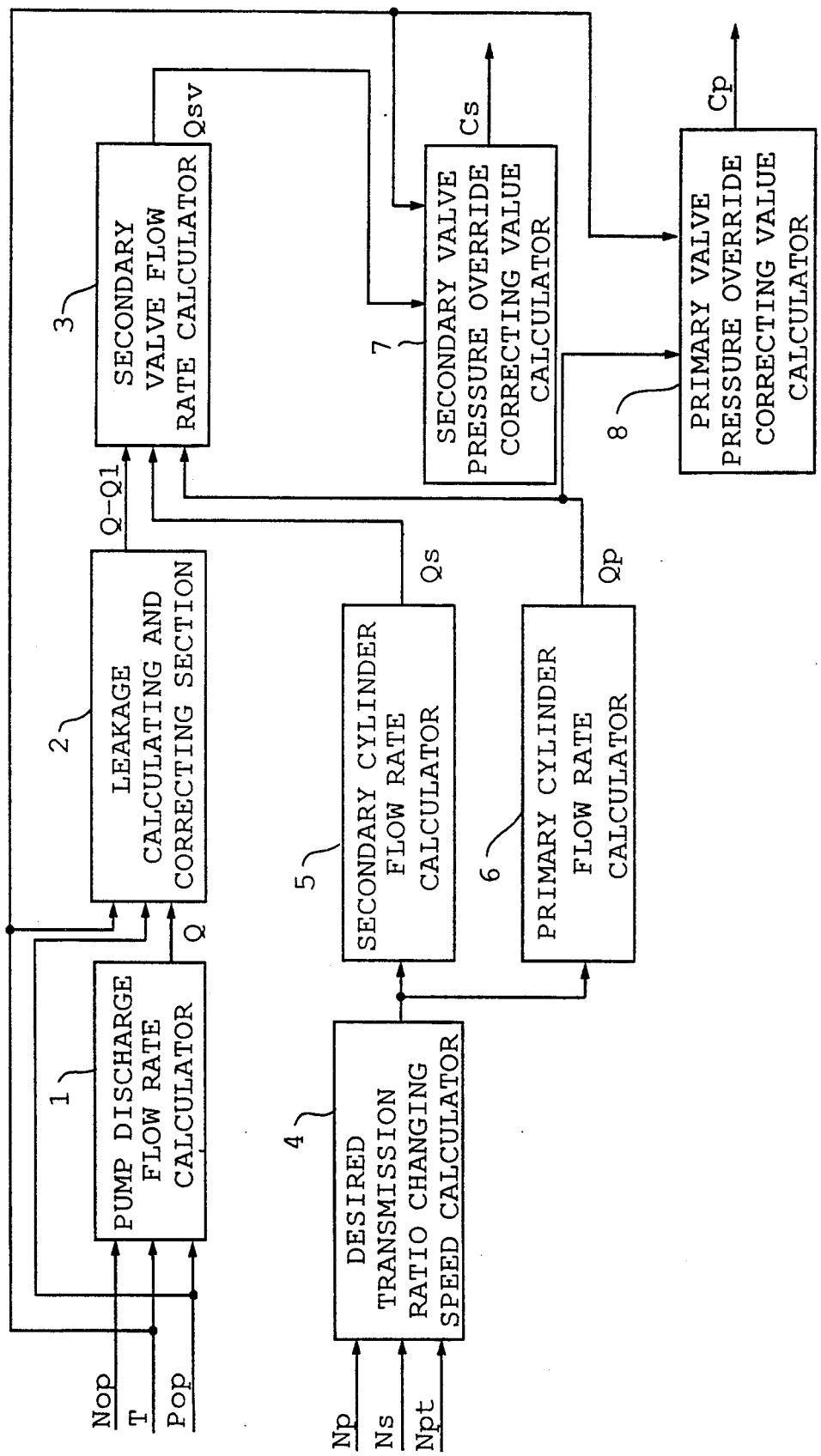
FIG. 2 shows a block diagram of a control system of the present invention.
Figure 3:
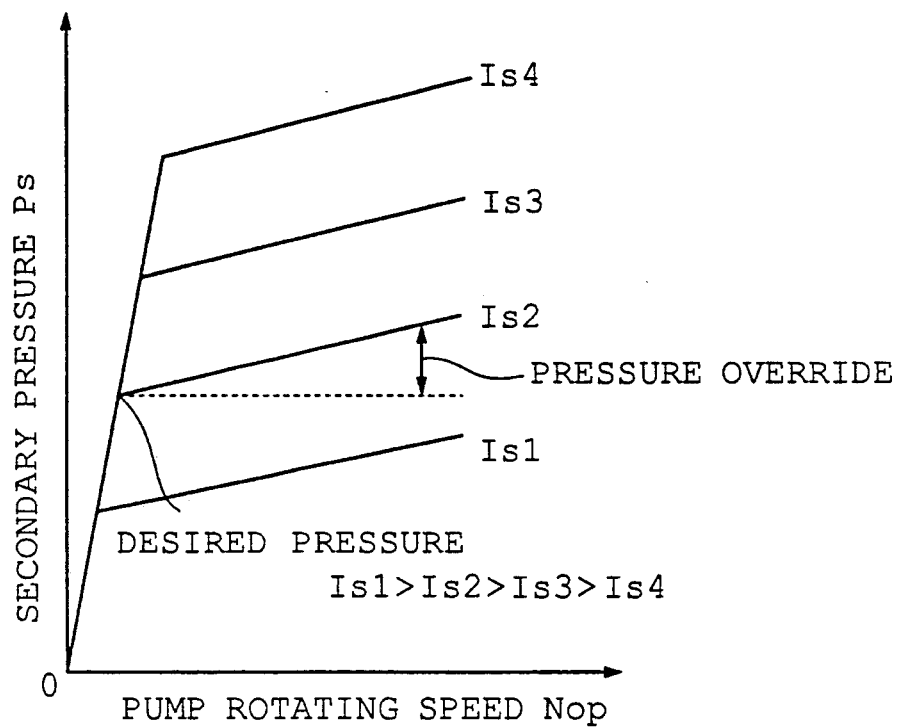
FIG. 3 is a graph showing characteristics of a secondary pressure in relation to rotating speed of an oil pump.
Figure 4:
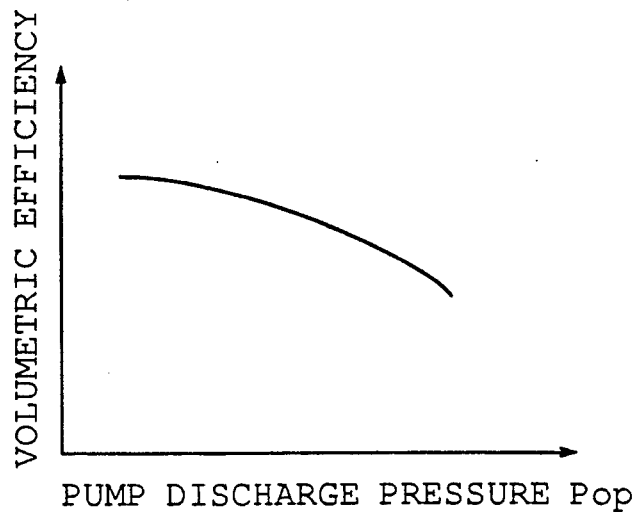
FIG. 4 is a graph showing characteristics of discharge flow rate and volumetric efficiency of the oil pump.
Figure 5:
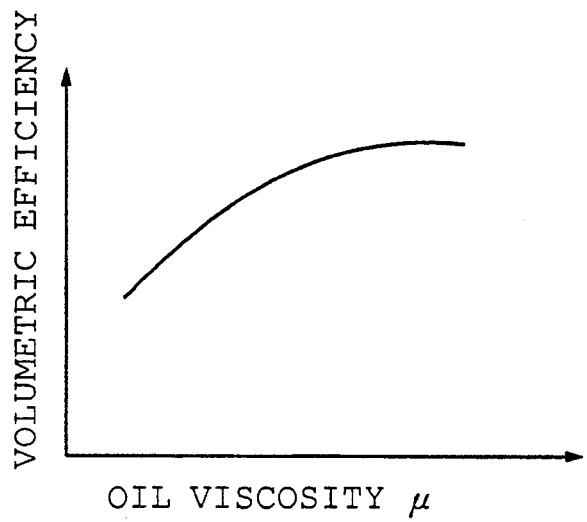
FIG. 5 is a graph showing characteristics of oil viscosity and volumetric efficiency of the oil pump.

Referring to FIG. 2, an electronic control system of the present invention comprises a pump discharge flow rate calculator 1 applied with pump rotating speed Nop, oil temperature T, and pump discharge pressure Pop for calculating a pump discharge flow rate Q. In a positive displacement pump, the discharge flow rate Q is represented by an equation $Q = \eta \cdot d \cdot Nop$ which is constructed from a volumetric efficiency $\eta$, a displacement d, and the pump rotating speed Nop. The volumetric efficiency $\eta$ is a function of the discharge pressure Pop and an oil viscosity $\mu$. As shown in FIG. 4, as the discharge pressure Pop increases, the volumetric efficiency $\eta$ reduces. As shown in FIG. 5, as the oil viscosity $\mu$ increases, the volumetric efficiency $\eta$ increases. The oil viscosity $\mu$ reduces in proportion to an increase of the oil temperature T.

Accordingly, the volumetric efficiency $\eta$ is a function of the discharge pressure Pop and the oil temperature T. Thus, the discharge flow rate Q is calculated from the pump rotating speed Nop, the oil temperature T and the discharge pressure Pop.

The discharge flow rate Q is delivered to a leakage flow rate calculating and correcting section 2 to which the discharge pressure Pop and the oil temperature T are also fed. Since a leakage flow rate Ql is proportional to the discharge pressure Pop and reduces as the oil viscosity $\mu$ increases, the leakage flow rate Ql is calculated based on the discharge pressure Pop and the oil temperature T. The discharge flow rate Q is corrected by the leakage flow rate Ql as Q−Ql. The corrected flow rate Q−Ql is sent to a secondary valve flow rate calculator 3.

The system is further provided with a desired transmission ratio changing speed calculator 4 for calculating a desired transmission ratio changing speed. The calculator 4 is applied with a desired primary pulley speed Npt, a primary pulley speed Np, and a secondary pulley speed Ns. The desired transmission ratio changing speed is calculated based on the desired primary pulley speed Npt, and the primary and secondary pulley speeds Np and Ns. The desired transmission ratio changing speed is applied to a secondary cylinder flow rate calculator 5 and a primary cylinder flow rate calculator 6, respectively.

Each of the flow rates of the oil fed to and discharged from the secondary cylinder 28 and the primary cylinder 31 is determined in accordance with a volume changing speed of the cylinder, that is represented by a transmission ratio changing speed. Consequently, the cylinder flow rate calculators 5 and 6 calculate a secondary cylinder flow rate Qs and a primary cylinder flow rate Qp based on the desired transmission ratio changing speed, respectively.

In place of the desired transmission ratio changing speed calculator 4, an actual transmission ratio changing speed calculator may be provided. In the actual transmission ratio changing speed calculator, an actual transmission ratio changing speed is calculated in accordance with the proportional relation between the primary pulley speed Np and the secondary pulley speed Ns for calculating the cylinder flow rates Qs and Qp.

The flow rates Qs and Qp are fed to the valve flow rate calculator 3. In the secondary valve flow rate calculator 3, a secondary valve flow rate Qsv of the valve 24 is calculated in accordance with the corrected flow rate Q−Ql and the cylinder flow rates Qs and Qp. If the flow rate Qs and Qp are entering flow rates, the secondary valve flow rate Qsv is calculated by subtracting the flow rates Qs and Qp from the flow rate Q−Ql. If the flow rates Qs and Qp are discharging flow rates, the secondary valve flow rate Qsv is calculated by adding the flow rates Qs and Qp to the flow rate Q−Ql.

Figure 6:
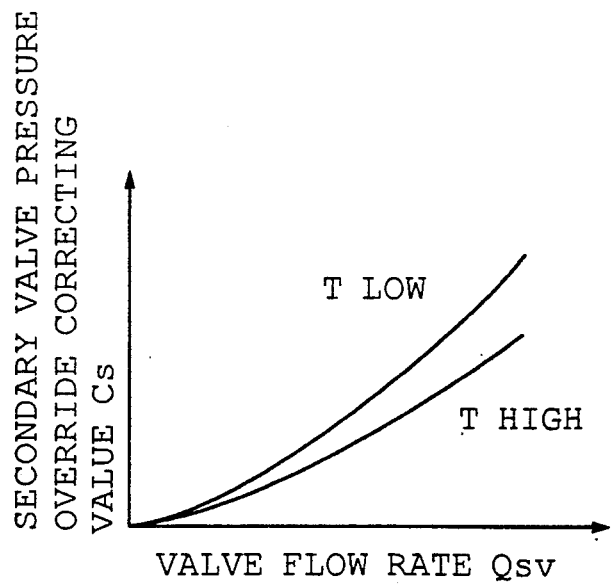
FIG. 6 is a graph showing a characteristic of a correcting value for pressure override in a secondary valve.

The flow rate Qsv is fed to a secondary valve pressure override correcting value calculator 7. Since the pressure override is influenced by the oil viscosity, namely oil temperature, the oil temperature T is also applied to the calculator 7. As shown in FIG. 6, a correcting value Cs of the pressure override in the secondary valve has a characteristic dependent on the secondary valve flow rate Qsv and the oil temperature T. Thus, the correcting value Cs is calculated in accordance with the valve flow rate Qsv and the oil temperature T, so as to control the pressure override to a predetermined pressure override. The solenoid current Is is corrected by the calculated pressure override correcting value Cs.

Figure 7:
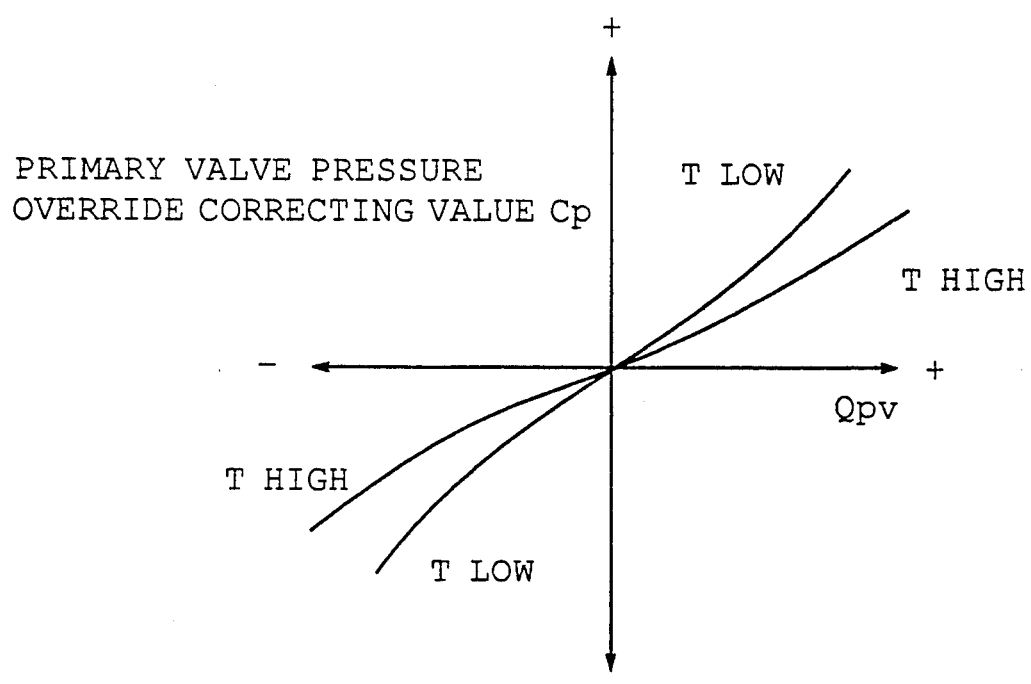
FIG. 7 is a graph showing characteristics of a correcting value for pressure override in a primary valve.

The primary cylinder flow rate Qp of the primary cylinder flow rate calculator 6 and the oil temperature T are further applied to a primary valve pressure override calculator 8. As shown in FIG. 7, a correcting value Cp of the pressure override in the primary valve has characteristics in dependency on a primary valve flow rate Qpv. Thus, the primary valve pressure override correcting value Cp is calculated in accordance with the primary valve flow rate Qpv and the oil temperature T, so that the pressure override is controlled to a predetermined pressure override. The solenoid current Ip is corrected by the calculated pressure override correcting value Cp.

In accordance with the operation of the secondary pressure control valve 24, the secondary pressure Ps is controlled. The secondary pressure is equal to the pump discharge pressure Pop. Thus, the secondary pressure Ps can be used as the discharge pressure Pop. In the electronic control system, the correcting value Cs of the secondary valve flow rate Qsv, the correcting value Cp of the primary valve flow rate Qpv of the primary cylinder 31, and the solenoid currents Is and Ip are updated at every 10 to 15 ms by executing calculating programs. In place of the secondary pressure Ps for calculating new correcting values Cs and Cp, the last solenoid current is used for calculating the correcting values. Thus, the correcting value is obtained without using a pressure sensor.

In accordance with the present invention, the solenoid current is corrected in accordance with the pressure override correcting value based on the flow rate of oil passing through the valve. Thus, the actual pressure coincides with the desired pressure, thereby preventing the belt from slipping, excessive oil to the hydraulic cylinder, and malfunctioning of the transmission.

The flow rate of the oil through the valve is detected and calculated without using an oil-flow meter and a pressure sensor, and the pressure override is corrected based on the calculated flow rate in accordance with feedforward control. Thus, the system is simplified in the structure for control stability.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A system for controlling a control valve provided in a hydraulic control system of a continuously variable transmission having a pair of pulleys and a belt around said pulleys, the control system having a pump for pumping oil, a hydraulic cylinder provided on one of the pulleys, the cylinder being connected to vary a gap width of the pulley in accordance with the oil supplied from said pump through the control valve, and a control unit for applying solenoid current to the control valve in order to control relief pressure to obtain a desired oil pressure, the controlling system comprising:
   first calculator means for calculating flow rate of the oil through the control valve in accordance with temperature of the oil,
   second calculator means for calculating a pressure override correcting value representing a value for correcting excessive pressure to the desired oil pressure in accordance with said flow rate and said temperature of the oil, and
   correcting means responsive to the correcting value for correcting the solenoid current with said correcting value so as to effectively prevent the belt from slipping and attaining optimum control in a compact structure.

2. The system according to claim 1, wherein
   the first calculator means calculates the flow rate based on a discharge flow rate of the oil pump, temperature of the oil, and a transmission ratio of the transmission.

3. The system according to claim 2, wherein
   the second calculator means calculates the flow rate further based on a transmission ratio changing speed of the transmission.

4. A system for controlling a pressure control valve in a hydraulic system having a pump for supplying hydraulic fluid to a hydraulic device through the control valve, the system comprising a control unit for applying a control signal to the control valve in order to control relief pressure to obtain a desired pressure, the control system comprising:
   first calculator means for calculating flow rate for the hydraulic fluid through the control valve in accordance with temperature of the hydraulic fluid,
   second calculator means for calculating a pressure override correcting value representing a value of correcting excessive pressure to the desire pressure in accordance with said flow rate and said temperature of the hydraulic fluid passing through the control valve, and
   correcting means responsive to the correcting value for correcting the control signal with said structure.

* * * * *